(12) United States Patent
Ruprecht et al.

(10) Patent No.: US 10,458,576 B2
(45) Date of Patent: *Oct. 29, 2019

(54) HOSE ASSEMBLY WITH MODIFIED THERMOPLASTIC INNER TUBE

(71) Applicant: TEKNOR APEX COMPANY, Pawtucket, RI (US)

(72) Inventors: Roland Ruprecht, Attleboro, MA (US); Paul Kroushl, Franklin, MA (US); Timothy L. Chapman, Stanton, TN (US); Maryellen Cox, Cranston, RI (US)

(73) Assignee: TEKNOR APEX COMPANY, Pawtucket, RI (US)

( * ) Notice: Subject to any disclaimer, the term of this patent is extended or adjusted under 35 U.S.C. 154(b) by 5 days.

This patent is subject to a terminal disclaimer.

(21) Appl. No.: 15/712,424

(22) Filed: Sep. 22, 2017

(65) Prior Publication Data

US 2018/0106398 A1 Apr. 19, 2018

Related U.S. Application Data

(60) Provisional application No. 62/407,725, filed on Oct. 13, 2016.

(51) Int. Cl.
| | | |
|---|---|---|
| F16L 11/00 | (2006.01) | |
| F16L 11/20 | (2006.01) | |
| F16L 11/12 | (2006.01) | |

(52) U.S. Cl.
CPC ............. *F16L 11/20* (2013.01); *F16L 11/12* (2013.01)

(58) Field of Classification Search
CPC .. F16L 11/00; F16L 11/10; F16L 11/12; F16L 33/213

USPC ............... 138/126, 109, 128, 171, 30
See application file for complete search history.

(56) References Cited

U.S. PATENT DOCUMENTS

| | | |
|---|---|---|
| 1,104,508 A | 7/1914 | Huthsing |
| 1,453,823 A | 5/1923 | Baird |
| 2,612,910 A | 10/1952 | Krupp |
| 3,073,353 A | 1/1963 | Rittenhouse |
| D195,540 S | 6/1963 | Knight |
| 3,162,470 A | 12/1964 | Owens |
| 3,205,913 A | 9/1965 | Sperry |
| 3,530,900 A | 9/1970 | Kish |

(Continued)

FOREIGN PATENT DOCUMENTS

| | | |
|---|---|---|
| GB | 904638 | 8/1962 |
| GB | 1017331 | 1/1966 |

(Continued)

OTHER PUBLICATIONS

Chapman, Declaration Regarding Test Results of HydroHose Brand Hose Assembly, Declaration, May 18, 2017, 1 page.

*Primary Examiner* — James F Hook
(74) *Attorney, Agent, or Firm* — Hudak, Shunk & Farine Co. LPA

(57) ABSTRACT

A hose assembly, preferably a garden hose assembly, preferably having an inner tube in contact with and covered by an outer tube or jacket, wherein the jacket is not bonded, connected or attached to the inner tube between and couplers of the hose assembly, and wherein the inner tube includes a modified thermoplastic composition that exhibits desirable characteristics including fatigue resistance, abrasion resistance, and puncture resistance.

16 Claims, 3 Drawing Sheets

(56) References Cited

U.S. PATENT DOCUMENTS

| | | | |
|---|---|---|---|
| D231,928 | S | 6/1974 | Nelson |
| 3,885,593 | A | 5/1975 | Koerber |
| RE28,688 | E * | 1/1976 | Cook ........................ C08J 3/24 |
| | | | 523/300 |
| 3,939,875 | A | 2/1976 | Osborn et al. |
| 4,181,157 | A | 1/1980 | DeCamp |
| D254,505 | S | 3/1980 | Parsons |
| 4,477,109 | A | 10/1984 | Kleuver |
| 4,478,661 | A | 10/1984 | Lewis |
| 4,541,657 | A | 9/1985 | Smyth |
| D283,342 | S | 4/1986 | Tisserat |
| 4,850,620 | A | 7/1989 | Puls |
| 4,929,478 | A | 5/1990 | Conaghan |
| 4,944,972 | A | 7/1990 | Blembereg |
| D334,046 | S | 3/1993 | Klose |
| 5,195,563 | A | 3/1993 | Brooks |
| 5,285,561 | A | 2/1994 | Manning |
| 5,302,428 | A | 4/1994 | Steele et al. |
| 5,314,941 | A * | 5/1994 | Yamanaka ............... C08L 21/00 |
| | | | 524/425 |
| 5,413,147 | A | 5/1995 | Moreiras et al. |
| D368,304 | S | 3/1996 | Morrison |
| 5,570,711 | A * | 11/1996 | Walsh ..................... B32B 25/08 |
| | | | 138/137 |
| D383,378 | S | 9/1997 | Schrader |
| D387,146 | S | 12/1997 | Morrison |
| D392,722 | S | 3/1998 | Kurz |
| D413,657 | S | 9/1999 | Lidgett |
| D413,968 | S | 9/1999 | Lester |
| 6,024,132 | A | 2/2000 | Fujimoto |
| 6,113,153 | A | 9/2000 | Yang |
| 6,179,008 | B1 * | 1/2001 | Kawazura ................. B32B 7/12 |
| | | | 138/125 |
| 6,186,181 | B1 | 2/2001 | Schippl |
| 6,264,069 | B1 * | 7/2001 | Hughes .................... B67D 1/08 |
| | | | 138/30 |
| 6,302,152 | B1 | 10/2001 | Mulligan |
| 6,334,466 | B1 * | 1/2002 | Jani ....................... F16L 11/088 |
| | | | 138/126 |
| D483,096 | S | 12/2003 | Gotoh |
| 6,948,527 | B2 | 9/2005 | Ragner et al. |
| 7,168,451 | B1 | 1/2007 | Dundas |
| D575,377 | S | 8/2008 | Roman |
| D586,435 | S | 2/2009 | Reckseen |
| 7,504,151 | B2 | 3/2009 | Emad et al. |
| 7,549,448 | B2 | 6/2009 | Ragner et al. |
| D605,737 | S | 12/2009 | Von Glanstaetten |
| D613,378 | S | 4/2010 | Hinson |
| D613,780 | S | 4/2010 | Henry et al. |
| D613,827 | S | 4/2010 | Damaske |
| D631,351 | S | 1/2011 | Coon |
| 7,887,662 | B2 | 2/2011 | Wagner et al. |
| D642,245 | S | 7/2011 | Mezzalira |
| 7,971,617 | B2 | 7/2011 | Henry et al. |
| 7,975,633 | B2 | 7/2011 | Henry et al. |
| D645,632 | S | 9/2011 | Henry et al. |
| D648,502 | S | 11/2011 | Henry et al. |
| D648,503 | S | 11/2011 | Henry et al. |
| D650,052 | S | 12/2011 | Drenth |
| 8,141,609 | B2 | 3/2012 | Henry et al. |
| 8,211,262 | B2 | 7/2012 | Henry et al. |
| D666,644 | S | 9/2012 | Henry |
| 8,272,420 | B2 | 9/2012 | Henry |
| 8,291,941 | B1 | 10/2012 | Berardi |
| 8,291,942 | B2 | 10/2012 | Berardi |
| D671,196 | S | 11/2012 | Montalvo |
| 8,359,991 | B2 | 1/2013 | Henry et al. |
| 8,371,143 | B2 | 2/2013 | Ragner |
| D679,784 | S | 4/2013 | Meyer |
| 8,453,701 | B2 | 6/2013 | Henry |
| 8,479,775 | B2 | 7/2013 | Swails et al. |
| 8,479,776 | B2 | 7/2013 | Berardi |
| D687,528 | S | 8/2013 | Meyer |
| 8,539,985 | B2 * | 9/2013 | Weil ....................... F16L 11/083 |
| | | | 138/126 |
| D691,261 | S | 10/2013 | Kawamura |
| D693,393 | S | 11/2013 | Henry |
| D705,284 | S | 5/2014 | Nussbaum |
| D705,285 | S | 5/2014 | Nussbaum |
| D706,904 | S | 6/2014 | Faraon Chaul Huerta |
| 8,757,213 | B2 | 6/2014 | Berardi |
| 8,776,836 | B2 | 7/2014 | Ragner et al. |
| 8,826,838 | B2 | 9/2014 | Henry et al. |
| D714,935 | S | 10/2014 | Nishioka |
| D717,406 | S | 11/2014 | Stanley |
| D717,848 | S | 11/2014 | Henry et al. |
| 8,936,046 | B2 | 1/2015 | Ragner |
| D722,681 | S | 2/2015 | Berardi |
| 8,951,380 | B2 | 2/2015 | Henry |
| D723,669 | S | 3/2015 | Berardi |
| D724,186 | S | 3/2015 | Berardi |
| D724,187 | S | 3/2015 | Savage |
| 9,022,076 | B2 | 5/2015 | Ragner et al. |
| D731,032 | S | 6/2015 | Yang |
| D736,357 | S | 8/2015 | Melo |
| D736,358 | S | 8/2015 | Melo |
| D736,359 | S | 8/2015 | Melo |
| D736,914 | S | 8/2015 | Schultz |
| D738,471 | S | 9/2015 | Melo |
| D739,493 | S | 9/2015 | Wyne |
| D744,562 | S | 12/2015 | Hassan |
| D744,563 | S | 12/2015 | Hassan |
| D744,564 | S | 12/2015 | Hassan |
| 9,234,610 | B2 | 1/2016 | Baxi et al. |
| 9,279,525 | B2 | 3/2016 | Berardi |
| D757,233 | S | 5/2016 | Vaz |
| D760,363 | S | 6/2016 | Yang |
| 9,810,357 | B2 * | 11/2017 | Blanchette ............ F16L 33/207 |
| 9,863,565 | B2 * | 1/2018 | LaTulippe ............... F16L 11/12 |
| 10,000,035 | B2 * | 6/2018 | Blanchette ................ B32B 1/00 |
| 10,132,435 | B2 * | 11/2018 | Blanchette ................ B32B 1/08 |
| 2003/0111126 | A1 | 6/2003 | Moulton |
| 2004/0256016 | A1 | 12/2004 | Arima |
| 2007/0051418 | A1 * | 3/2007 | Rowles ................... F16L 9/133 |
| | | | 138/137 |
| 2007/0227606 | A1 * | 10/2007 | Sakazaki ............... F16L 11/111 |
| | | | 138/121 |
| 2008/0000540 | A1 | 1/2008 | Seyler |
| 2008/0023093 | A1 * | 1/2008 | Mobley ................ B29C 43/021 |
| | | | 138/109 |
| 2008/0262403 | A1 | 10/2008 | Martin |
| 2008/0293868 | A1 | 11/2008 | Obrecht |
| 2009/0272454 | A1 | 11/2009 | Garver et al. |
| 2010/0071795 | A1 | 3/2010 | Montalvo |
| 2010/0089521 | A1 * | 4/2010 | Ng ........................ F16L 11/081 |
| | | | 156/145 |
| 2010/0147446 | A1 | 6/2010 | Ciolczyk |
| 2010/0212768 | A1 | 8/2010 | Resendes |
| 2011/0083787 | A1 | 4/2011 | Henry |
| 2011/0088804 | A1 * | 4/2011 | Shinoda ................... B32B 1/08 |
| | | | 138/137 |
| 2012/0208946 | A1 | 8/2012 | Shan et al. |
| 2012/0227363 | A1 | 9/2012 | Nussbaum |
| 2013/0098887 | A1 | 4/2013 | Henry |
| 2013/0113205 | A1 | 5/2013 | Berardi |
| 2014/0007881 | A1 | 1/2014 | Rummery et al. |
| 2014/0124125 | A1 | 5/2014 | Nussbaum et al. |
| 2014/0124127 | A1 | 5/2014 | Henry |
| 2014/0124136 | A1 | 5/2014 | Nussbaum |
| 2014/0130930 | A1 | 5/2014 | Ragner |
| 2014/0150889 | A1 | 6/2014 | Ragner |
| 2014/0305586 | A1 | 10/2014 | Hupp, Sr. |
| 2014/0305587 | A1 | 10/2014 | Henry |
| 2014/0307987 | A1 | 10/2014 | Henry |
| 2014/0345734 | A1 | 11/2014 | Berardi |
| 2014/0374020 | A1 | 12/2014 | Warnock, II |
| 2015/0007902 | A1 | 1/2015 | Ragner |
| 2015/0041016 | A1 | 2/2015 | Ragner |
| 2015/0129042 | A1 | 5/2015 | Ragner |
| 2015/0219259 | A1 | 8/2015 | Weems |

(56) References Cited

U.S. PATENT DOCUMENTS

2015/0219260 A1 8/2015 Kury
2016/0312929 A1* 10/2016 Blanchette ................ B32B 1/00

FOREIGN PATENT DOCUMENTS

WO 2014169057 A1 10/2014
WO 2015023592 A1 2/2015

* cited by examiner

HOSE ASSEMBLY WITH MODIFIED THERMOPLASTIC INNER TUBE

FIELD OF THE INVENTION

The present invention relates to a hose assembly, preferably a garden hose assembly, preferably having an inner tube in contact with and covered by a jacket or outer tube, wherein the outer tube is not bonded, connected or attached to the inner tube between end couplers of the hose assembly, and wherein the inner tube includes a modified thermoplastic composition that exhibits desirable characteristics including fatigue resistance, abrasion resistance, and puncture resistance.

BACKGROUND OF THE INVENTION

Hoses, especially those used residentially, are subjected to an assortment of different conditions that can affect the service lives of the hoses. For example, hoses are often kept on reels when not in use, and undergo numerous winding and unwinding cycles. Winding cycles and flexing of the hoses can cause the hoses to fatigue, resulting in cracking or splitting, or the like of the inner tube. Also, hoses are often dragged and/or pulled across a ground surface that is not always smooth or hose-friendly, and such surfaces can be abrasive or abusive to the hoses. In addition, hoses that are expandable in one or more of circumference and longitudinal length undergo expansion and contraction forces that also affect service lives of such hoses. Further, hoses can be stored in folded or kinked positions for extending periods of time at a wide range of temperatures. The kinks and folds can be severe enough to form a crack or split in the hose or a tube of the hose.

In view of the above, there is still a need for relatively lightweight hoses that are durable, fatigue resistant, abrasion resistant and puncture resistant.

SUMMARY OF THE INVENTION

The problems described above and others are solved by the hose assemblies of the present invention which have an inner layer including a modified thermoplastic composition, preferably a rubber modified thermoplastic composition comprising a thermoplastic polymer, a plasticizer, and a rubber, which can be crosslinked to desired degree in some embodiments; and a non-bonded outer tube or jacket, with the inner tube and outer tube being connected at end couplers of the hose assembly. The hose assemblies provide improved maneuverability due to their light weight and are fatigue, abrasion and puncture resistant due to the specific composition of the inner tube.

According to one embodiment and objective of the present invention, a hose assembly is disclosed comprising a lightweight rubber modified thermoplastic inner tube surrounded by a fabric-like or non-fabric outer tube that serves as a jacket for the inner tube. In some embodiments, the jacket has a substantially fixed length that prevents the length of the hose assembly from changing at different pressure conditions. The length of the hose assembly is fixed by the length of the outer jacket.

According to a further embodiment and objective of the present invention, a hose assembly is disclosed having an outer jacket of a fixed length. The rubber modified thermoplastic inner tube can expand along a radial axis of the tube when pressure at or above a minimum fluid pressure is applied to the inner tube. When the pressure falls below the minimum fluid pressure, the inner tube of the hose assembly will contract radially. The outer tube limits the radial expansion of the inner tube in one embodiment.

According to still another embodiment and objective of the present invention, the rubber modified thermoplastic inner tube can expand longitudinally along the length-wise axis of the hose between hose ends or couplers, as well as along the radial axis of the tube when pressure at or above a minimum fluid pressure is applied to the inner tube. When the pressure falls below the minimum fluid pressure, the inner tube of the hose assembly will contract both longitudinally and radially. The outer tube limits the longitudinal and radial expansion of the inner tube in the embodiment.

In one aspect, a hose assembly is disclosed, comprising a first end coupler and a second end coupler; an inner tube having a longitudinal length and a first circumference below a minimum expansion pressure, wherein the inner tube is expandable to a larger, second circumference upon application of fluid pressure on an inner surface of the inner tube at or above the minimum expansion pressure, wherein the inner tube comprises a modified thermoplastic composition comprising a thermoplastic polymer, a plasticizer, and a rubber, wherein the thermoplastic polymer is present in a major amount by weight based on the total weight of the thermoplastic polymer and the rubber; and an outer tube covering the inner tube, wherein a first end of the inner tube and a first end of the outer tube are connected to the first end coupler, wherein a second end of the inner tube and a second end of the outer tube are connected to the second end coupler, wherein the outer tube is not bonded, connected or attached to the inner tube between the first and second end couplers of the hose assembly.

In another aspect, a hose assembly is disclosed, comprising a first end coupler and a second end coupler; an inner tube having a longitudinal length and a first circumference below a minimum expansion pressure, wherein the inner tube is expandable to a larger, second circumference upon application of fluid pressure on an inner surface of the inner tube at or above the minimum expansion pressure, wherein the inner tube comprises a modified polyvinyl chloride composition comprising a polyvinyl chloride polymer, a plasticizer, and a rubber, wherein the thermoplastic polymer is present in a major amount by weight based on the total weight of the thermoplastic polymer and the rubber; and an outer tube covering the inner tube, wherein a first end of the inner tube and a first end of the outer tube are connected to the first end coupler, wherein a second end of the inner tube and a second end of the outer tube are connected to the second end coupler, wherein the outer tube is not bonded, connected or attached to the inner tube between the first and second end couplers of the hose assembly, wherein the outer tube comprises a fabric material.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
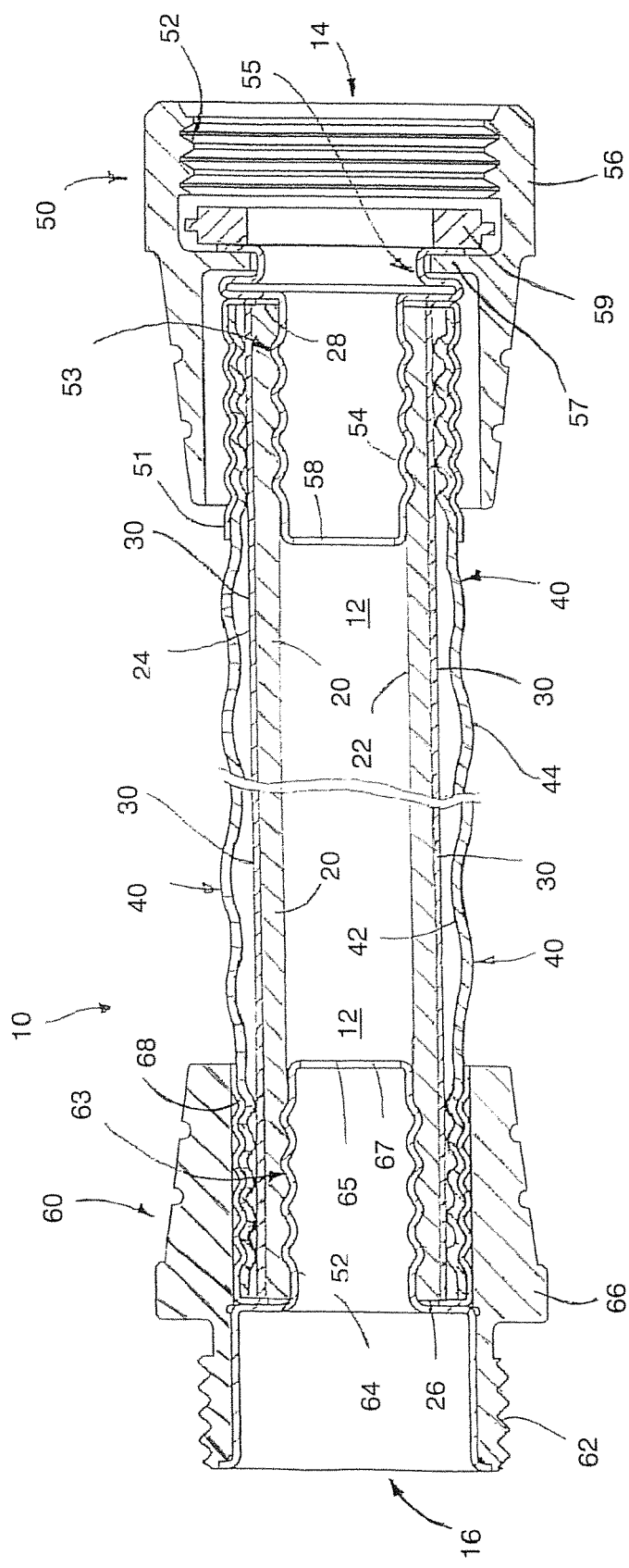
FIG. 1 is a partial, cross-sectional, longitudinal side view of one embodiment of a hose assembly of the present invention in a longitudinally and circumferentially contracted position.

In this specification, all numbers disclosed herein designate a set value, individually, in one embodiment, regardless of whether the word "about" or "approximate" or the like is used in connection therewith. In addition, when the term such as "about" or "approximate" is used in conjunction with a value, the numerical range may also vary, for example by 1%, 2%, 5%, or more in various other, independent, embodiments.

Numerical ranges include all values from and including the lower and the upper values, in increments of one unit, provided that there is a separation of at least two units between any lower value and any higher value. As an example, if a compositional, physical or other property, such as, for example, molecular weight, weight percentages, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amount of a component in a composition and properties of specific components.

The hose assembly of the present invention includes a rubber modified thermoplastic inner tube, covered or jacketed by an outer tube, which can be of fabric and/or non-fabric construction with fabric being preferred in some embodiments, with the hose assembly being relatively light in weight, versatile, abrasion resistant, fatigue resistant, and puncture resistant. The inner tube can expand circumferentially or radially to an expanded position or state in response to at least a minimum fluid pressure applied internally to the inner tube. In additional embodiments, the inner tube can expand longitudinally along the length-wise axis of the tube in response to at least minimum fluid pressure applied internally to the inner tube. The circumference of the outer tube controls radial expansion of the inner tube. The length of the jacket or outer tube controls longitudinal expansion of the inner tube. In some embodiments, the length of the outer tube is substantially the same as the length of the inner tube. That is, the difference in length in an unpressurized or relaxed state between the two is less than 10% or, 5%, 3% or 1% in some embodiments. The inner tube circumferentially or radially and, in some embodiments longitudinally, contracts when fluid pressure inside the tube falls below the minimum fluid pressure to a contracted or non-expanded position or state. In one embodiment, the outer tube is formed around the inner tube in a continuous process that welds a fabric and/or non-fabric material, preferably using hot air, into the outer tube.

Figure 2:
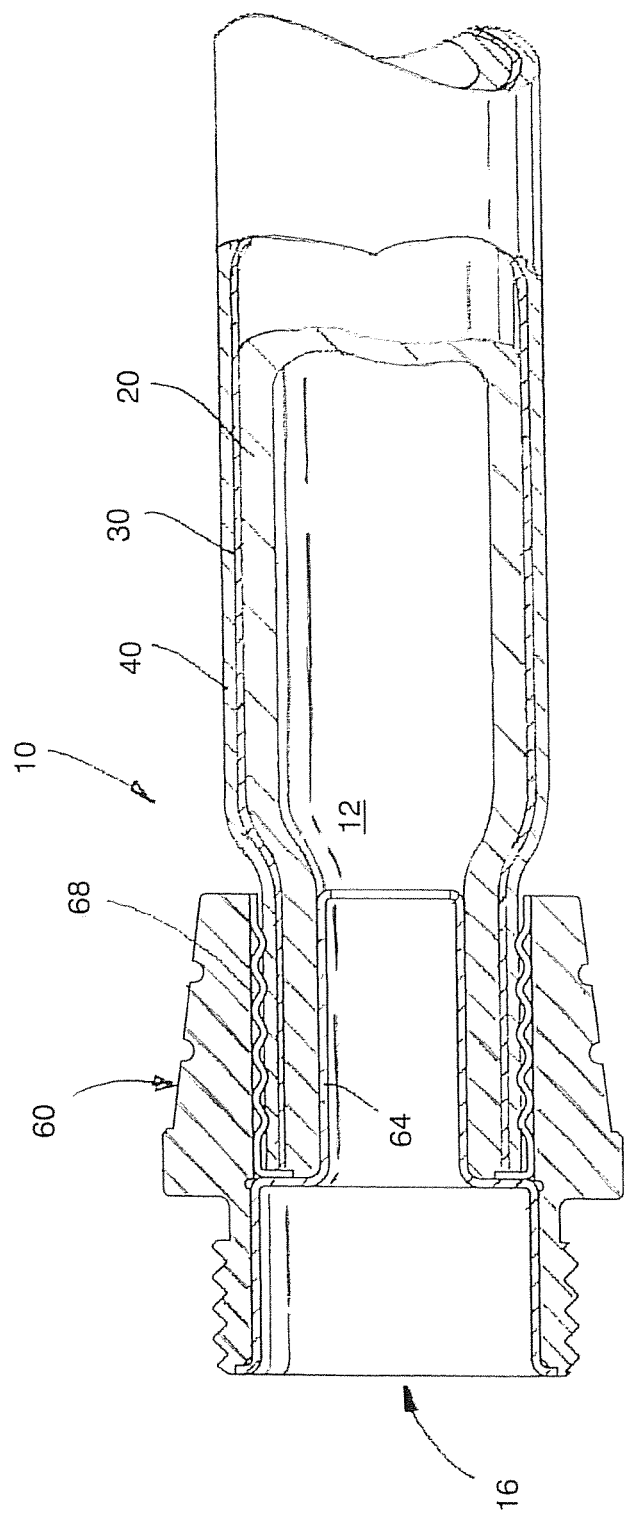
FIG. 2 is a partial, cross-sectional, longitudinal side view of one embodiment of a hose assembly of the present invention in an expanded position.

Referring now to the drawings wherein like reference numbers refer to like parts throughout the several views, a hose assembly 10 is illustrated in FIGS. 1 and 2, wherein FIG. 1 illustrates the hose assembly in an out-of-service or contracted position and FIG. 2 an expanded position. Hose assembly 10 includes an inlet 14 and an outlet 16, with fluid passage 12 being located there between. The hose assembly includes inner tube 20 that extends between a pair of fittings or couplers, see for example male coupler 60 and female coupler 50. The inner tube 20 is self-expanding and self-contracting. Inner tube 20 has an inner surface 22 and an outer surface 24, see FIGS. 1-2, for example. When a fluid, such as water when the hose assembly is utilized as a garden hose, is introduced into the inner tube 20 and exerts at least a minimum fluid pressure on an inner surface 22, the inner tube 20 expands, generally radially, from a first circumference to a larger, second circumference in an expanded position; and in some embodiments longitudinally between the couplers 50, 60. In some embodiments the inner tube 20 can expand longitudinally to a length that is generally at least 1.2, 1.5 or 2 times, desirably between 2 and 4 times and preferably at least four times the length of the inner tube 20 when in a relaxed or contracted position. In other embodiments, the inner tube 20 can expand longitudinally to a length that is generally up to 1.5 times or up to 1.25 times or up to 1.2 or 1.1 times the length of the inner tube 20 when in a relaxed or contracted position. Inner tube 20 can be formed such that the second circumference provides the tube inner surface 22 with a desired inner diameter, for example about 0.5 inch (1.27 cm) or about 0.625 inch (1.59 cm). When fluid pressure decreases below the minimum fluid pressure, the inner tube 20 relaxes or contracts radially, preferably back to the first circumference in one embodiment. In other embodiments, the inner tube may not contract to the first circumference.

The thickness of the inner tube 20 can vary depending upon the materials utilized to construct the same. In various embodiments, the wall thickness of the inner tube ranges generally from about 1.0 to about 2.0 mm, desirably from about 1.2 to about 1.8 mm, preferably from about 1.40 to about 1.65 mm, as measured in a radial direction in a contracted position.

Outer Tube

Figure 3:
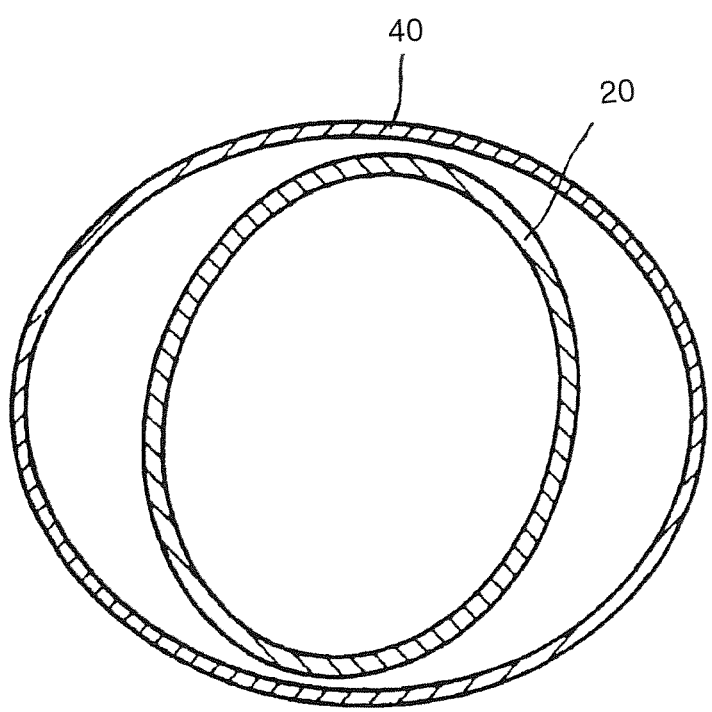
FIG. 3 is a cross-sectional view with one embodiment of an inner tube and outer tube of the hose assembly showing the inner rubber tube unconnected to the outer tube.

Hose assembly 10 also includes a jacket or outer tube 40 that is also connected between first and second couplers, see for example male couplers 60 and female couplers 50. In one embodiment, the outer tube 40 is not connected or attached to the inner tube 20 or, if present, an outer slip coating layer 30, further described below, between the couplers. Stated in another manner, the outer tube 40 is preferably unattached, unconnected, unbonded, and unsecured to either the inner tube 20 or slip coating layer 30, when present, along the entire length of the inner tube 20 and slip coating layer 30, when present, between the first end and the second end of the outer tuber 40, and thus the tube 40 is able to move freely with respect to the inner tube 20 and/or slip coating layer 30 when the hose assembly expands or contracts. FIG. 3 illustrates a cross-sectional view of one embodiment of an inner tube 20 and an outer tube 40 of the hose assembly showing the inner tube unconnected to the outer tube. In one embodiment, any longitudinal and circumferential or radial expansion of inner tube 20 is limited by the dimensions, i.e. maximum length and/or maximum inner diameter or circumference of outer tube 40. The outer tube 40 is configured to protect the inner tube 20 and slip coating layer 30, when present, such as from one or more of cuts, friction, abrasion, puncture, over-expansion (bursting) and UV exposure.

In various embodiments the outer tube 40 can be braided or woven into a fabric that is subsequently formed into the tube. In other embodiments, the outer tube 40 can be pre-formed into a tube and the inner tube inserted into the outer tube or outer tube placed over the inner tube. In still other embodiments, the outer tube can be braided or woven or otherwise formed around the inner tube. Non-woven fabrics are utilized in some embodiments. In additional embodiments, the outer tube is formed from a non-fabric material, such as a film, fiber-reinforced film, sheet or similar construction. Suitable materials include, but are not limited to, polyolefins, polyesters, and polyamides such as nylon. Natural materials can be used in some embodiments. Polyester is preferred in some embodiments. Outer tube 40 should be formed from a material that is pliable and strong enough to withstand a desired internal pressure that can be exerted by outer surface 24 of inner tube 20. Thickness of the outer tube 40 is dependent on yarn denier when fabric-like materials are used. This will be dictated by desired internal pressure as mentioned above.

In some embodiments, the hose assembly 10 is formed such that the outer tube 40 has an outer diameter between about 0.635 cm and 2.175 cm or 3 cm; or between 1.27 cm and 2.54 cm when the inner tube 20 is subjected to a pressure of about 413.7 kPa (about 60 psi). The inner tube can be pressurized using any suitable method such as, but not limited to, the burst strength test method described herein modified such that the inner tube is pressurized to the defined pressure. The outer diameter can be measured with a caliper.

In some embodiments of the present invention, the hose assembly jacket or outer tube 40 is formed around the inner tube 20, preferably in a continuous process. In a preferred embodiment a hot air welding process is utilized. While the process described utilizes the term "fabric", it is to be understood that the process is applicable to each of, and is thus inclusive of, the materials described herein. During the process, a piece of fabric (or other material) having first and second ends and first and second sides located therebetween is formed into a tubular shape. A portion of the first side and the second side is heated to a temperature where the material, in particular polymer, that forms the fabric melts and the sides are bonded together, with the inner tube being present within or surrounded by the outer tube formed by the fabric. A weld 46 is formed in the area where the fabric is heated and the sides are joined. As the fabric is joined along the length of the sides, the welded fabric forms a spine or weld seam 48 extending longitudinally along the length of the fabric, comprising melted fabric. In a preferred embodiment, the weld seam has an overlap or weld width of 0.375 inch (9.5 mm)+/− 0.0625 inch (+/− 1.5 mm), generally measured perpendicular to the longitudinal length of the weld seam. In another embodiment, the variation is +/− 3 mm. In one embodiment, the process that forms the welded seam is a continuous process that heats the fabric with hot air, with temperatures ranging between 550° C. and 750° C. and preferably between 600° C. and 700° C. The welding process also produces a weld seam having a wall thickness that is generally at least 50% greater, desirably at least 75% greater and preferably about 100% greater, i.e. two times greater, than the average thickness of the non-welded fabric of the outer tube.

In one embodiment, the inner tube 20 is supplied from a reel or spool. In another embodiment, the inner tube 20 is supplied directly from an upstream extrusion line. The inner tube enters a folding fixture which contains a series of guides and is combined with a flat, woven fabric. The fabric is supplied from a fabric source, such as a bulk container and straightened and tensioned as it enters the folding fixture. The folding fixture forms the fabric around the inner tube, shapes the fabric into a round, tubular shape, and forms the correct or desired overlap for welding. The tubular fabric profile and inner tube exit the folding fixture. At the exit of the folding fixture, a nozzle directs hot air between the overlapped fabric side surfaces. This hot air heats the fabric to or above its melting point just before the fabric and inner tube pass through a set of nip rollers which force the heated fabric surfaces against each other under pressure. A strong bond between the two fabric surfaces is formed at this point. The fabric and tube may be wound onto a reel for future assembly or cut to length and processed into a finished hose immediately. Hot air seaming devices are available from companies such as Miller Weldmaster of Navarre, Ohio.

Inner Tube

The inner tube comprises a rubber modified thermoplastic. Surprisingly, it has been found that the inner tube has increased durability, fatigue resistance, abrasion resistance and puncture resistance when a thermoplastic polymer, present in a major amount with respect to all polymeric and rubber components in the inner tube, is combined with a rubber, with the rubber being present in a minor amount. Miscible blends are preferred. In some embodiments the thermoplastic polymer forms a matrix in which the rubber is dispersed, generally in the form of particles. In other embodiments, generally when higher amounts of rubber are present, co-continuous phases may be present or the PVC may become for particles in the rubber matrix When used herein, the term "polymer" includes a homopolymer and a copolymer, which is defined as a polymer having two or more different monomers. The term "thermoplastic polymer" includes a homopolymer, a copolymer, which is defined as a polymer having two or more different monomers, and a polymer mixture including two or more different polymers, unless specifically excluded or otherwise defined. As used herein, "homopolymer" denotes a polymer comprising repeat units derived from a single monomer type, but does not exclude residual amounts of other components used in preparing the homopolymer. "Copolymer" means a polymer prepared by the polymerization of at least two different types of monomers and those prepared from more than two different monomer types, e.g. terpolymers, tetrapolymers, etc.

Non-limiting examples of suitable thermoplastic polymers suitable for use in the inner tube of the invention include, but are not limited to, polyamides or nylons; polyamide block copolymers; polyolefins; randomly chlorinated polyolefins; polyesters; polyester-polyether block copolymer; PET block copolymers; polycarbonates; poly (ether sulfones); acrylic polymers; polyanilines; polyimides; polyketones; polylactic acid; polysulfides; vinyl polymers; polystyrene; polyethers; polysilicones; polyureas; polyurethanes; acrylonitrile-butadiene-styrene copolymers (ABS); acrylonitrile ethylene styrene (AES); styrene acrylonitrile copolymer (SAN); polypheylene ether (PPE); and halogenated thermoplastic polymers such as polyvinyl chloride and blends thereof.

In one embodiment, the inner tube includes one or more polyolefins, which as utilized herein are defined as one or more of a polyolefin polymer and a polyolefin copolymer, unless otherwise indicated. Polyolefins suitable for use in the compositions of the present invention comprise amorphous or crystalline homopolymers or copolymers of two or more same or different monomers derived from alpha-monoolefins having from 2 to about 12 carbon atoms, and preferably from 2 to about 8 carbon atoms. Examples of suitable olefins include ethylene, propylene, 1-butene, 1-pentene, 1-hexene, 2-methyl-1-propene, 3-methyl-1-pentene, 4-methyl-1-pentene, 5-methyl-1-hexene, and combinations thereof. Polyolefins include, but are not limited to, low-density polyethylene, high-density polyethylene, linear-low-density polyethylene, polypropylene (isotactic and syndiotactic), ethylene/propylene copolymers, ethylene/α-olefin copolymer, propylene/α-olefin copolymers, and polybutene. Polyolefin copolymers can also include the greater part by weight of one or more olefin monomers and a lesser amount of one or more non-olefin monomers such as vinyl monomers including vinyl acetate, or a diene monomer, etc. Polar polyolefin polymers include ethylene acrylate and ethylene vinyl acetate, for example. In a preferred embodiment, EVA is utilized that has a vinyl acetate content of greater than 5 percent. Generally, a polyolefin copolymer includes less than 40 weight percent of a non-olefin monomer, desirably less than 30 weight percent, and preferably less than about 10 weight percent of, or does not contain a non-olefin monomer.

In various embodiments of the present invention, the inner tube comprises a polyvinyl chloride polymer. The term "polyvinyl chloride polymer", as used herein, is a vinyl chloride polymer, such as polyvinyl chloride (PVC), e.g. a polyvinyl chloride homopolymer or a vinyl chloride copolymer. Further, the polyvinyl chloride polymer may include copolymerized units of one or more additional comonomers, which comonomers will typically account for up to 20 weight percent of the copolymer. Examples of suitable comonomers include $C_2$-$C_6$ olefins, for example ethylene and propylene; vinyl esters of straight chain or branched $C_2$-$C_4$ carboxylic acids, such as vinyl acetate, vinyl propionate, and vinyl 2-ethyl hexanoate; vinyl halides, for example vinyl fluoride, vinylidene fluoride or vinylidene chloride; vinyl ethers, such as vinyl methyl ether and butyl vinyl ether; vinyl pyridine; unsaturated acids, for example maleic acid, fumaric acid, methacrylic acid and their mono- or diesters with $C_1$-$C_{10}$ mono- or dialcohols; maleic anhydride, maleic acid imide as well as the N-substitution products of maleic acid imide with aromatic, cycloaliphatic and optionally branched aliphatic substituents; acrylonitrile and styrene. The vinyl chloride copolymer includes, for example, vinyl chloride/vinyl acetate copolymer, vinyl chloride/vinylidene chloride copolymer, or a vinyl chloride/ethylene copolymer.

The polyvinyl chloride polymer may also include graft copolymers of vinyl chloride, for example, ethylene copolymers, such as ethylene vinyl acetate, and ethylene copolymer elastomers, such as EPDM (copolymers comprising copolymerized units of ethylene, propylene and dienes) and EPR (copolymers comprising copolymerized units of ethylene and propylene) that are grafted with vinyl chloride.

Further, the polyvinyl chloride polymer may also include a polymer blend of the above-mentioned vinyl chloride polymer or vinyl chloride copolymer with other miscible or compatible polymers including, but not limited to, chlorinated polyethylene, thermoplastic polyurethane, olefin polymers such as a methacryl polymer or acrylonitrile-butadiene-styrene polymer (ABS resin).

Commercially available polyvinyl chloride polymers are available from sources such as Oxy Vinyls, LP. As OV 240F and OV 355; Formosa as Formolon 680 or 690; and Shintech as SE 1300 and SE 1400.

The polyvinyl chloride polymer generally has a molecular weight that ranges from 40,000 to 250,000, desirably from 100,000 to 250,000 and preferably from 115,000 to 230,000. The number average molecular weight of a polymer, rubber or other component described in this application is measured by gel permeation chromatography (GPC). The appropriate component is dissolved in a suitable solvent (typically 0.001-0.010 wt. %), and an appropriate quantity is an injected into a GPC device. One suitable GPC device is available from Waters of Milford, Mass. as a Waters Breeze Dual Pump LC. The GPC analysis is performed at an appropriate elusion rate (1 to 10 m L/min). The molecular weight distribution is characterized by the signals from UV and refractive index detectors, and number average molecular weights are calculated using a calibration curve generated from a series of narrow molecular weight distribution polystyrenes with peak molecular weights of 500 to 1,000,000 as standard.

The molecular weight can also be described by its intrinsic viscosity (IV) value. Molecular weights that can be used have an IV range from 0.95 to 1.60 and preferably between 0.99 to 1.59 IV when tested by ASTM 1243.

In order to impart the desired characteristics to the inner tube of the hose assembly of the invention, the thermoplastic polymer is present in an amount generally described as being 100 parts per hundred resin (phr). As such, the thermoplastic polymer is listed in the amount of 100 phr. Thus, other components of the compositions of the inner tube are expressed as amounts based on 100 phr, i.e. 100 parts of the thermoplastic polymer.

The inner tube also includes a rubber component. The rubber component can be a polar rubber or a non-polar rubber. The polarity of the thermoplastic polymer and rubber can be matched by one of ordinary skill in the art. The rubber component includes one or more of a natural rubber and a synthetic rubber. As known in the art, natural rubber is formed from the diene isoprene (2-methyl-1,3-butadiene). Examples of conjugated dienes suitable for forming synthetic rubbers include, but are not limited to, isoprene, 1,3-butadiene and chloroprene. Optionally, the rubbers can be formed from dienes and monomers which are not dienes. For example, styrene-butadiene rubber is a copolymer of 1,3-butadiene and styrene. Nitrile rubber is copolymerized from butadiene and acrylonitrile. Butyl rubber is copolymerized from isobutylene and a small percentage of isoprene. Non-polar rubbers include, but are not limited to, EP-type rubbers and EPDM, for example. Still other rubbers that can be used are styrenic block copolymers such as SEBS; VAE copolymer, wherein the vinyl acetate is present in an amount from 60-90% by weight, and chlorosulfonated polyethylene.

In a preferred embodiment of the present invention the inner tube comprises at least nitrile rubber. Nitrile rubber as utilized herein refers to acrylonitrile butadiene rubber as well as hydrogenated nitrile butadiene rubber and carboxylated nitrile rubber. Nitrile rubber has an acrylonitrile content generally from about 25 to about 40 and preferably from about 32 to about 35 weight percent based on the total weight of acrylonitrile and butadiene in the nitrile rubber.

In various embodiments of the invention, the rubber utilized in the inner tube is cross-linked to a desired degree. The rubber is at least partially cross-linked utilizing any suitable cross-linking agent known to those of ordinary skill in the art. At least partial cross-linking produces rubber particles that yield improved processing characteristics over non-crosslinked rubbers are readily dispersible in the thermoplastic matrix polymer. In some embodiments, the at least partially cross-linked rubber has a median particle size that ranges generally from about 0.1 to about 1.0 mm and preferably from about 0.2 to about 0.6. In preferred embodiments, the at least partially cross-linked rubber has a median particle size of less than 0.5 mm.

Suitable rubbers are available from many commercial sources including, but not limited to, nitrile rubber as ZEALLOY™ 1422 from Zeon Chemicals; as BAYMOD™ N XL 3364 VP from Arlanxeo; and as Chemigum P-83, P-89, Chemigum PFC, and P-35 from Omnova.

The rubber component is present in the inner tube of the invention in an amount that ranges generally from about 10 to less than 100 phr, desirably in an amount from about 30 to about 90 phr and preferably in an amount from about 50 to about 83 phr (per hundred parts of the thermoplastic polymer).

In preferred embodiments of the invention, the inner tube also includes at least one plasticizer suitable for use with the thermoplastic polymer utilized in the composition of the inner tube. Plasticizers are included to generally make the composition softer and more flexible. Typical plasticizers for polyvinyl chloride polymers include ester plasticizers such as adipates, azelates, citrates, benzoates, phthalates, terephthalates, sebacates, and trimellitates.

The compositions of the inner tube of the present invention, in various embodiments optionally include plasticizers in the form of a softener such as a mineral oil softener, or synthetic resin softener, a biorenewable softener such as vegetable oil, or combinations thereof. Various biorenewable softeners are disclosed for example in U.S. Publication 2014/0100311, herein incorporated by reference. The softener can beneficially reduce the temperatures at which the compositions are processable. Oil softeners are generally mixes of aromatic hydrocarbons, naphthene hydrocarbons and paraffin, i.e., aliphatic, hydrocarbons. Those in which carbon atoms constituting paraffin hydrocarbons occupy 50% by number or more of the total carbon atoms are called "paraffin oils". Those in which carbon atoms constituting naphthene hydrocarbons occupy 30 to 45% by number of the total carbon atoms are called "naphthene oils", and those in which carbon atoms constituting aromatic hydrocarbons occupy 35% by number or more of the total carbon atoms are called "aromatic oils". Examples of synthetic resin softeners include, but are not limited to, polyisobutylene, and polybutenes.

The inner tube composition includes a plasticizer or a combination of plasticizers, when present, in an amount generally from about 50 to about 100 phr, desirably in an amount from about 70 to about 95 phr and preferably in an amount from about 75 to about 85 phr.

The compositions of the inner tube of the present invention may include additional additives including, but not limited to light stabilizers, antioxidants, flame retardant additives, pigments, heat stabilizers, processing aids, mold or die release agents, flow enhancing agents, nanoparticles, foam agents, platelet fillers and non-platelet fillers. Examples of fillers for use in the compositions include, but are not limited to, one or more of calcium carbonate, talc, clay, zeolite, silica, titanium dioxide, carbon black, barium sulfate, mica, glass fibers, whiskers, carbon fibers, magnesium carbonate, glass powders, metal powders, kaolin, graphite, and molybdenum disulfide. Suitable fillers also include bio-based fillers, e.g. various fibers, cellulose, and/or lignin.

In various embodiments of the invention, the inner tube has a hardness that ranges from 35 to 95 Shore A, desirably from 50 to 80 Shore A and preferably from 60 to 70 Shore A as measured according to ASTM D-2240. The composition of the inner tube has a compression set that ranges from 35 to 65%, desirably from 40 to 60% and preferably from 42 to 58% when tested by ASTM D695 at 60° C.

The inner tube can be formed in one embodiment as follows. The thermoplastic polymer is preferably combined with a plasticizer, if desired, utilizing mixing equipment such as ribbon blender, plow mixer, or high intensity mixer. The composition is mixed to achieve a preferably dry, free-flowing blend. Additionally, the mixing equipment is used to disperse and distribute any additives added to the composition. The rubber can be added directly to the composition in the mixing equipment or through a second stream such as a gravimetric feeder or belt system. The inner tube composition blend is then processed utilizing melt mixing equipment suitable for the thermoplastic. For PVC, suitable equipment includes a Banbury, Farrel continuous mixer, Buss co-kneader, or twin screw extruder. The inner tube composition is processed at a suitable temperature that does not degrade the components of the formulation. In one embodiment, conditions used by the melt mixing equipment yield a temperature between 320-395° F. (160° C.-202° C.). After melt mixing, the material is then fed in one embodiment, to a single screw extruder and extruded using underwater pelletization or hot-face pelletization, for example. Additionally, the material from the melt mixing equipment could undergo additional processing through a two-roll mill and then dicing in a dicer system such as a Cumberland dicer. The pellets or other form of material are processed into a tube on a single screw extruder, in one embodiment. The barrel zone temperatures can range from about 145° C. to about 170° C. A screen pack is preferably used to build and maintain back pressure in the extruder. Screen packs typically contain at least one 20 mesh screen and sometimes multiple screens up to 80 mesh. The extrusion tooling utilized to form the tube consists of a tubing tip and tubing dye. The tooling is sized to produce a desired tube size. The tooling is preferably sized to fall within a drawdown ratio of 0.8 to 4.0:1 and a draw balance of 0.9 to 1.15. The resulting extruded tube can be cooled in a water bath having a temperature that ranges from about 15 to about 50° C.

In some embodiments of the present invention, slip coating layer 30 is provided on outer surface 24 of inner tube 20, see FIGS. 1 and 2. A slip coating can also reduce tackiness of the outer surface of the inner tube. In a preferred embodiment, the slip coating layer 30 can be extruded onto or coextruded with the inner tube 20 layer. Other application methods such as coating would also be acceptable so long as the slip coating performs its intended function. In some embodiments of the present invention, a slip coat may not be necessary depending on the inner tube materials selected and the manufacturing method.

The slip coating layer 30 can be a continuous or discontinuous layer or layers. In one preferred embodiment the slip coating layer is continuous, at least prior to a first expansion of inner tube 20 after the slip coating layer has been applied. Depending on the thickness of the slip coating layer 30 relatively thin layers, after one or more expansions of the inner tube 20, may exhibit cracking, splitting, crazing, fracturing or the like. Importantly though, such layers have still been found to be effective. That said, the initial thickness of the slip coating layer 30 ranges generally from about 0.025 mm to about 0.51 mm, desirably from about 0.05 to about 0.25 and preferably from about 0.10 to about 0.20 mm, or about 0.15 mm measured in a radial direction.

As illustrated in FIGS. 1 and 2, the slip coating layer 30 is located between the inner tube 20 and the outer tube covering 40. In a preferred embodiment, the slip coating layer is not directly connected to the outer tube covering 40 between the first coupler and the second coupler, e.g. male coupler 60 and female coupler 50, such that the outer tube covering 40 can slide or otherwise move in relation to the slip coating layer 30 during expansion and contraction of hose assembly 10. In an expanded position, the outer surface of the slip coating layer 30 is in contact with the inner surface of the outer tube covering 40.

The slip coating layer comprises a lubricant, optionally incorporated into or blended with a carrier material.

In one embodiment, the lubricant is a siloxane polymer or copolymer, or a fluorinated polymer or a combination thereof. A siloxane polymer masterbatch is available from Dow-Corning, such as MB50.321™, and from Wacker as Genioplast™. Fluorinated polymer is available from McLube as MAC 1080™. In some embodiments lubricant is present in the slip coating layer in an amount generally from about 1 to about 40 parts, desirably from about 2 to about 30 parts and preferably in an amount from about 3 to about 20 parts based on 100 total parts by weight of the slip coating layer. In other embodiments, the lubricant can be a liquid, semi-solid or solid material that serves to reduce friction between the inner tube and the outer tube. Non-limiting examples of other lubricants include, but are not limited to, oils such as silicone oil, waxes, polymers, including elastomers.

As described herein, in one embodiment the lubricant is mixed with a carrier material that aids in affixing the lubricant on an outer surface of the inner tube. Suitable materials include, but are not limited to, polyolefins, thermoplastic elastomers or a combination thereof. In one embodiment, the carrier material comprises a polyolefin and one or more of the thermoplastic elastomers utilized in the inner tube layer.

Along with the lubricant, the slip coating layer may also include additional additives including, but not limited to, antioxidants, foaming agents, pigments, heat stabilizers, UV absorber/stabilizer, processing aids, flow enhancing agents, nanoparticles, platelet fillers and non-platelet fillers. Various other lubricants or slip coating layers known to those of ordinary skill in the art may also be utilized, if desired.

Hose assembly 10 includes male coupler 60 at a first end and female coupler 50 at a second end. The male coupler 60 includes an external threaded section 62 and an internal connector 63 fixedly connected, such as by a press fit, to main body 66 of male coupler 60. Connector 63 includes a stem 64 initially having a smaller diameter portion 63 that is connected to a larger diameter portion connected to the inner side of threaded section 62. Fluid passing through male coupler 60 passes through internal connector 63, generally through aperture 67 in stem 64 and out through the end of connector 63 within threaded section 62. In one embodiment, the stem 64 is inserted into the inner tube 20. A portion of the outer tube covering 40 is also located between stem 64, inner tube 20 and the ferrule 68 of male coupler 60. Inner tube 20 and outer tube 40 are operatively connected and secured to male coupler 60 by expansion of the stem 64 outwardly towards ferrule 68. In other embodiments the ferrule can be crimped towards a relatively rigid stem in order to capture the inner tube and outer tube therebetween, securing the tubes to the male coupler 60. Other attachment mechanisms could also be utilized.

The female coupler 50 includes a main body 56 having an internal threaded section 52 that is operatively and rotatably connected to a second end of hose assembly 10 opposite the end containing male coupler 60. Threaded section 52 is constructed such that it can be operatively connected to a male fitting of a spigot, faucet, or other similar valve control device.

The internal connector 53 of female coupler 50 is rotatable in relation to main body 56 such that the main body is also rotatable in relation to the inner tube 20 and outer tube 40 which are operatively connected or fixed to stem 54. A ferrule 51 is placed onto the jacket or outer tube 40 and inner tube 20. The ferrule 51, inner tube 20, and fabric jacket outer tube 40 are then fitted onto stem 63. Stem 63 is then expanded to secure the hose to the fitting. As mentioned above with respect to the male coupler, alternative constructions can be utilized to secure the inner tube 20 and outer tube 40 to the female coupler 50. As illustrated in FIG. 1, connector 53 includes a receptacle 55 in the form of a cavity, recess, or the like that accommodates flange 57 of the main body 56. In the embodiment illustrated, the flange 57 is a ring-like feature projecting inwardly from the main body 56 and includes an end that is located within receptacle 55. The flange structure allows the main body 56 to spin or rotate around connector 53. A washer 59 is located at the base of threaded section 52 in order to provide a desired seal between the female coupler and a device that is threadably connectable to threaded section 52.

Alternatively, other common couplers, fittings or hose end connections can be utilized and include, but are not limited, crimped (external), barbed, or clamped couplings made from plastics, metals, or combinations thereof.

The hose assembly 10 is illustrated in a contracted position with respect to length and circumference in FIG. 1. In this position, the elastic inner tube 20 is in a contracted or relaxed state with no internal force being applied to the inner surface 22 sufficient to expand or stretch inner tube 20. Depending on the material utilized for outer tube covering 40, space may exist between the same and the slip coating layer 30, if present, and/or inner tube 20 when the hose assembly is in a contracted position.

The fluid pressure within inner tube 20 can be increased for example by preventing fluid from being expelled through outlet 16, such as with the use of an associated nozzle or the like (not shown) and introducing fluid under pressure into the inlet 14 of hose assembly 10. Once a minimum threshold pressure is met or exceeded, the inner tube 20 undergoes longitudinal and/or circumferential expansion. Expansion of inner tube 20 results in a decrease in wall thickness of the inner tube and an increase in the circumference or diameter of the inner tube and/or the length of the inner tube in some embodiments. Thus, a higher volume of fluid can be present in inner tube 20 in the expanded position as compared to the volume of fluid that can be present in a contracted position, below the minimum fluid pressure.

Depending upon the construction of the outer tube covering 40, in the expanded position, the covering may exhibit a relatively smooth, cylindrical character along its length, see FIG. 2 for example.

Standard water pressure for water exiting a spigot from a municipal water system is about 45 to about 75 psi (310.3 to 517.1 kPa) and typically about 60 psi, 413.7 kPa. Such pressure is sufficiently above a minimum fluid pressure required for the hose to expand. The minimum fluid pressure that causes the inner tube 20 of hose assembly 10 to expand will vary depending on the construction or composition thereof. When a nozzle or other flow restricting device is connected to the male coupler 60 of hose assembly 10, with the female coupler 70 being operatively connected to a spigot, the inner tube 20 will expand when the spigot valve is opened or turned on as water under pressure will flow into the hose. If the nozzle prevents the flow of fluid through the inner tube, the pressure inside the inner tube will achieve substantially the same pressure as that coming from the fluid pressure source, such as 60 psi (289.6 kPa) in the case of a standard municipal water supply. When fluid is released from the outlet 16 of hose assembly 10 through a suitable nozzle, the pressure inside the inner tube 20 is reduced. The hose assembly will remain in an expanded position when the fluid pressure remains above the minimum fluid pressure. In a preferred embodiment, the couplers are full flow fittings. They are not designed to create back pressure within the hose.

While in accordance with the patent statutes the best mode and preferred embodiment have been set forth, the scope of the invention is not intended to be limited thereto, but only by the scope of the attached claims.

The invention claimed is:

1. A hose assembly, comprising:
a first end coupler and a second end coupler;
an inner tube having a longitudinal length and a first circumference below a minimum expansion pressure, wherein the inner tube is expandable to a larger, second circumference upon application of fluid pressure on an inner surface of the inner tube at or above the minimum expansion pressure, wherein the inner tube inner surface defines a fluid passage and is adapted to directly come into contact with a fluid, wherein the inner tube comprises a modified thermoplastic composition comprising a thermoplastic polymer, a plasticizer, and a rubber, wherein the thermoplastic polymer is present in a major amount by weight based on the total weight of the thermoplastic polymer and the rubber; and
an outer tube covering the inner tube, wherein a first end of the inner tube and a first end of the outer tube are connected to the first end coupler, wherein a second end of the inner tube and a second end of the outer tube are connected to the second end coupler, wherein the outer tube is not bonded, connected or attached to the inner tube between the first and second end couplers of the hose assembly;
wherein the hose assembly longitudinal length is substantially fixed and does not change at different fluid pressure conditions on the inner surface of the inner tube, and
wherein the longitudinal length of the inner tube is substantially the same as the length of the outer tube without application of the fluid pressure on the inner surface of the inner tube.

2. The hose assembly according to claim 1, wherein the thermoplastic polymer comprises a polyvinyl chloride polymer at 100 parts per hundred resin (phr), wherein the rubber is at least partially cross-linked and is present in an amount from 10 to less than 100 phr.

3. The hose assembly according to claim 2, wherein the rubber is at least partially cross-linked and comprises nitrile rubber.

4. The hose assembly according to claim 2, wherein the polyvinyl chloride has an intrinsic viscosity value (IV) from 0.99 to 1.59 as measured according to ASTM 1243.

5. The hose assembly according to claim 4, wherein the rubber comprises nitrile rubber and the rubber is present in an amount from 10 to less than 100 phr, and wherein the plasticizer is an ester plasticizer.

6. The hose assembly according to claim 5, wherein the inner tube has a hardness that ranges from 50 to 80 Shore A as measured according to ASTM D-2240, and wherein the rubber has a median particle size that ranges from 0.1 to 1.0 mm.

7. The hose assembly according to claim 1, wherein the outer tube has a longitudinal length and a weld seam extending along the longitudinal length of the outer tube, the weld seam comprising melted outer tube material, and wherein the outer tube material comprises fabric.

8. The hose assembly according to claim 7, wherein the weld seam has a weld width of 9.5 mm+/−3.0 mm, and wherein the weld seam has a weld thickness that is at least 50% greater than a thickness of the fabric of the outer tube in a non-weld seam section.

9. A hose assembly, comprising:
a first end coupler and a second end coupler;
an inner tube having a longitudinal length and a first circumference below a minimum expansion pressure, wherein the inner tube is expandable to a larger, second circumference upon application of fluid pressure on an inner surface of the inner tube at or above the minimum expansion pressure, wherein the inner tube inner surface defines a fluid passage and is adapted to directly come into contact with a fluid, wherein the inner tube comprises a modified polyvinyl chloride composition comprising a polyvinyl chloride polymer, a plasticizer, and a rubber, wherein the thermoplastic polymer is present in a major amount by weight based on the total weight of the thermoplastic polymer and the rubber; and
an outer tube covering the inner tube, wherein a first end of the inner tube and a first end of the outer tube are connected to the first end coupler, wherein a second end of the inner tube and a second end of the outer tube are connected to the second end coupler, wherein the outer tube is not bonded, connected or attached to the inner tube between the first and second end couplers of the hose assembly, wherein the outer tube comprises a fabric material;
wherein the hose assembly longitudinal length is substantially fixed and does not change at different fluid pressure conditions on the inner surface of the inner tube; and
wherein the longitudinal length of the inner tube is substantially the same as the length of the outer tube without application of the fluid pressure on the inner surface of the inner tube.

10. The hose assembly according to claim 9, wherein the thermoplastic polymer comprises the polyvinyl chloride polymer at 100 parts per hundred resin (phr), wherein the rubber is at least partially cross-linked and is present in an amount from 10 to less than 100 phr.

11. The hose assembly according to claim 10, wherein the rubber is at least partially cross-linked and comprises nitrile rubber.

12. The hose assembly according to claim 10, wherein the polyvinyl chloride has an intrinsic viscosity value (IV) from 0.99 to 1.59 as measured according to ASTM 1243.

13. The hose assembly according to claim 12, wherein the rubber comprises nitrile rubber and the rubber is present in an amount from 10 to less than 100 phr, and wherein the plasticizer is an ester plasticizer.

14. The hose assembly according to claim 13, wherein the inner tube has a hardness that ranges from 50 to 80 Shore A as measured according to ASTM D-2240, and wherein the rubber has a median particle size that ranges from 0.1 to 1.0 mm.

15. The hose assembly according to claim 9, wherein the outer tube has a longitudinal length and a weld seam extending along the longitudinal length of the outer tube, the weld seam comprising melted outer tube material, and wherein the outer tube material comprises fabric.

16. The hose assembly according to claim 15, wherein the weld seam has a weld width of 9.5 mm+/−3.0 mm, and wherein the weld seam has a weld thickness that is at least 50% greater than a thickness of the fabric of the outer tube in a non-weld seam section.

* * * * *